(12) United States Patent
Barkai et al.

(10) Patent No.: US 7,082,105 B2
(45) Date of Patent: Jul. 25, 2006

(54) TOPOLOGY DISCOVERY IN ATM NETWORKS

(75) Inventors: Sharon Barkai, Shoham (IL); Ariel Noy, Herzliya (IL); Yoel Shkolnisky, Or-Yehuda (IL)

(73) Assignee: Sheer Networks Inc., Sunnyvale, CA (US)

( * ) Notice: Subject to any disclaimer, the term of this patent is extended or adjusted under 35 U.S.C. 154(b) by 1126 days.

(21) Appl. No.: 09/842,787

(22) Filed: Apr. 27, 2001

(65) Prior Publication Data

US 2002/0009085 A1      Jan. 24, 2002

Related U.S. Application Data

(60) Provisional application No. 60/200,507, filed on Apr. 28, 2000.

(51) Int. Cl.
*H04L 12/28* (2006.01)

(52) U.S. Cl. ....................................... 370/254

(58) Field of Classification Search ................. 370/254
See application file for complete search history.

(56) References Cited

U.S. PATENT DOCUMENTS

| 5,583,861 | A |   | 12/1996 | Holden |
|-----------|---|---|---------|--------|
| 5,586,267 | A | * | 12/1996 | Chatwani et al. ........... 709/223 |
| 5,648,969 | A |   | 7/1997  | Pasternak et al. |
| 5,781,537 | A |   | 7/1998  | Ramaswami et al. |
| 5,926,462 | A | * | 7/1999  | Schenkel et al. ........... 370/254 |
| 6,654,802 | B1 | * | 11/2003 | Oliva et al. ................. 709/224 |

* cited by examiner

*Primary Examiner*—Huy D. Vu
*Assistant Examiner*—Daniel Ryman
(74) *Attorney, Agent, or Firm*—AlphaPatent Associates Ltd.; Daniel J. Swirsky

(57) ABSTRACT

A method for topology discovery in an ATM network, the method including identifying an active VC between two ATM network device ports, and maintaining a link between the ATM network device ports in a topology graph where the active VC has the same VPI/VCI at both of the ports.

1 Claim, 3 Drawing Sheets

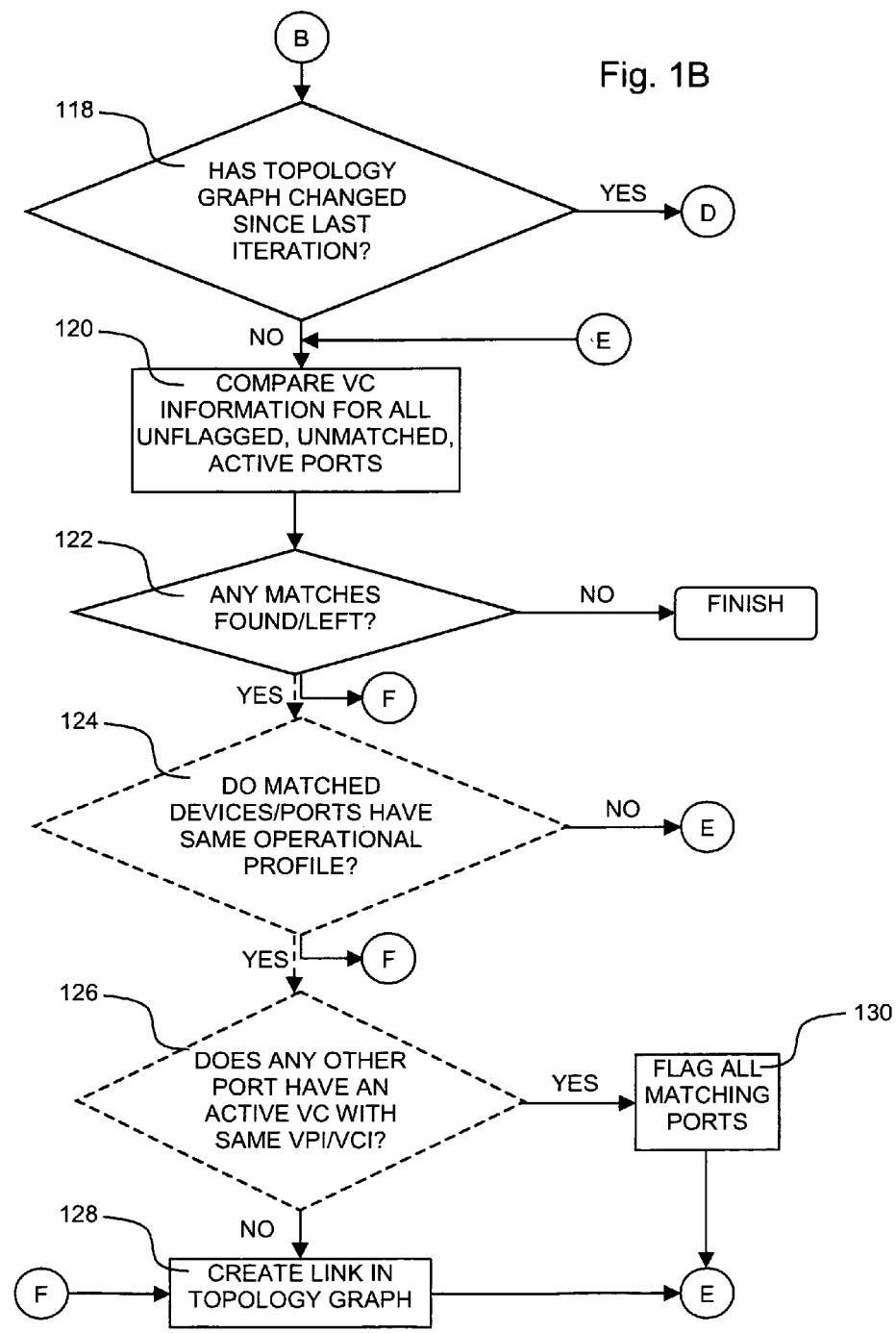

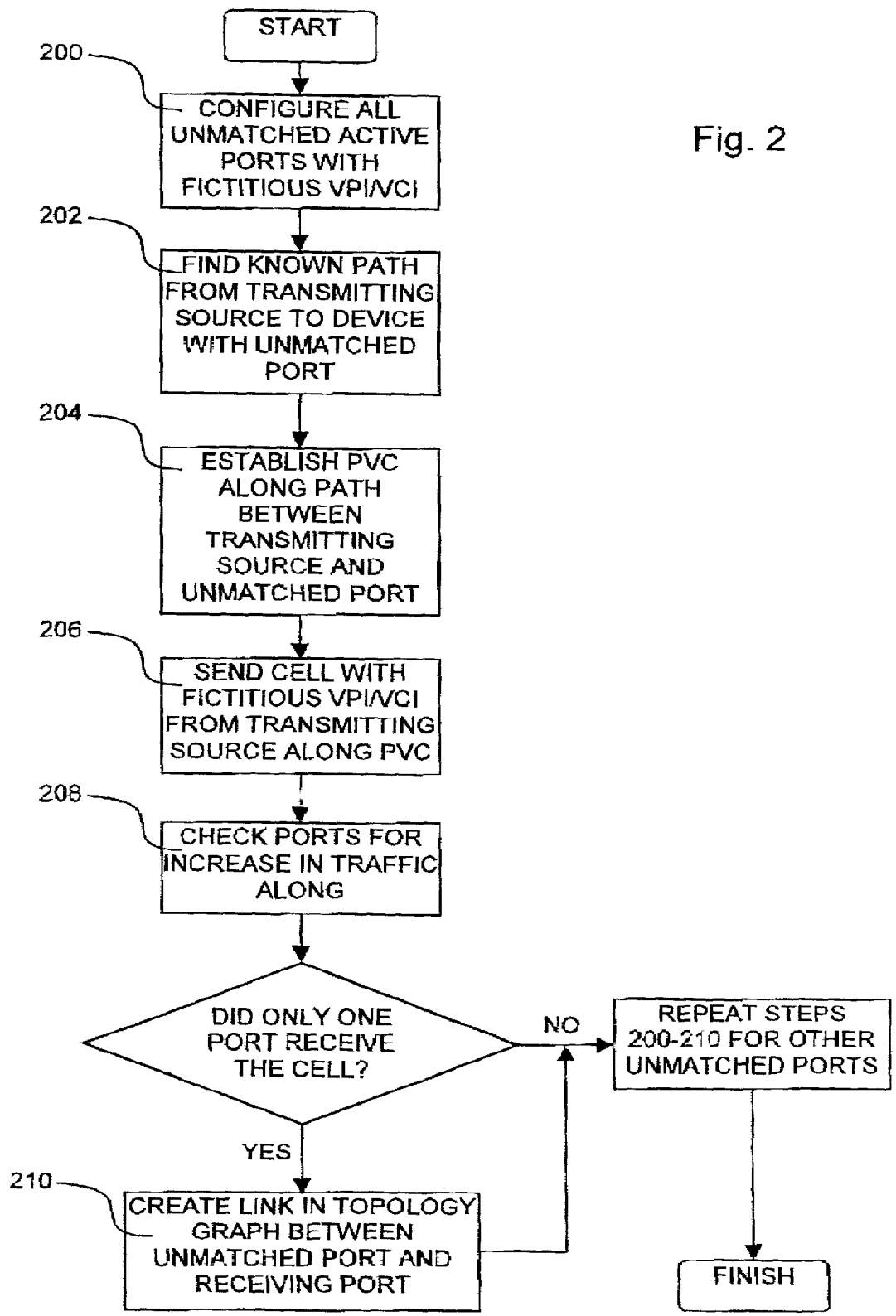

TOPOLOGY DISCOVERY IN ATM NETWORKS

CROSS-REFERENCE TO RELATED APPLICATIONS

This application is related to and claims priority from U.S. Provisional Patent Application No. 60/200,507, entitled "AUTONOMOUS AGENT ARCHITECTURE," filed Apr. 28, 2000, and incorporated herein by reference in its entirety.

FIELD OF THE INVENTION

The present invention relates to computer networks in general, and more particularly to methods and apparatus for topology discovery in ATM networks.

BACKGROUND OF THE INVENTION

In Asynchronous Transfer Mode (ATM) networks, network endpoints communicate via virtual channel connections (VCC). There are typically two methods by which a VCC may be established. In one method a permanent virtual circuit (PVC) is manually configured at each of the ATM switches between the two endpoints In another method the first ATM endpoint sends a "SETUP" message in accordance with the ATM access signaling protocol also referred to as the user-network interface (UNI) protocol, to an ATM switch to which it is connected. The ATM switch then communicates with other ATM switches to which it is attached in accordance with the ATM network signaling protocol also referred to as the network-node interface (NNI) protocol, until a path is found to the desired second ATM endpoint. The second ATM endpoint then accepts (or rejects) the connection, thus allowing communications to begin between the endpoints via the VCC Such a VCC is referred to as a switched virtual circuit (SVC).

A VCC is comprised of a sequence of virtual channels (VC), where each VC is defined by a logic connection between two ATM network nodes over a physical link between a port on one node and a port on the other node. For purposes of simplicity, "nodes" as referred to herein include both ATM endpoints and ATM switches. Thus, a VCC between a two endpoints A and D which is switched by two switches B and C along the path A-B-C-D comprises three VCs, one each between A and B, B and C, and C and D. Each VC is identified in the two switches at either end of the VC by a virtual channel identifier (VCI), and typically by a virtual path identifier (VPI) as well, both identifiers being assigned at the various switches along the VCC, either manually, or in accordance with signaling protocols. Commonly in ATM networks, the VPI/VCI of each VC vary along a single VCC, and it is the responsibility of each switch along the VCC to map each incoming VC to each outgoing VC by maintaining in memory the switch port and VPI/VCI of one VC and its mapping to the switch port and VPI/VCI of the next VC. Each ATM endpoint also typically keeps track of the endpoint port and VPI/VCI for each VC through which the endpoint communicates.

In ATM networks, as in other networks, knowledge of the network's topology, or the interconnections between network elements, has such uses as determining the location of network faults and determining the shortest communications path between two endpoints. In ATM networks with SVC support, as well as networks with open shortest path first (OSPF) or routing information protocol (RIP) support, the underlying network manages the topology via some addressing scheme, thus allowing management functions to request this information from the network without need for further topology discovery. In ATM networks without inherent topology support, such as ATM PVC networks, however, more indirect methods must be used. Certain prior art topology discovery methods utilize a process of flooding of topology information within the network In such systems, each device transmits on each of its links link state information to each of its neighbors and each of its neighbors, in turn, transmit the message to each of its own neighbors. In this manner, eventually, the entire network topology can be computed at each device in the network. It will be readily seen that in such systems, the use of a flooding technique can lead to infinite loops, in the absence of some control. Further, even with such control, a large number of messages are generated.

SUMMARY OF THE INVENTION

The present invention seeks to provide a novel method for topology discovery in ATM networks.

There is thus provided in accordance with a preferred embodiment of the present invention a method for topology discovery in an ATM network, the method including identifying an active VC between two ATM network device ports, and maintaining a link between the ATM network device ports in a topology graph where the active VC has the same VPI/VCI at both of the ports.

Further in accordance with a preferred embodiment of the present invention the identifying step includes identifying the active VC as being a VC having a traffic indicator at either of the ports indicating that a flow of bi-directional network traffic has been detected within a user-defined period of time.

Still further in accordance with a preferred embodiment of the present invention the maintaining step includes maintaining where the devices and the ports have compatible operational profiles.

Additionally in accordance with a preferred embodiment of the present invention the maintaining step includes maintaining where no other ATM device port in the network has a VPI/VCI for an active VC that is the same as the VPI/VCI for the active VC identified at the ports.

Moreover in accordance with a preferred embodiment of the present invention the identifying step includes identifying the active VC in a topology graph of interconnections between a plurality of ATM device ports for which port VC information has been gathered.

There is also provided in accordance with a preferred embodiment of the present invention a method for topology discovery in an ATM network, the method including in a topology graph having at least one link between two ATM device ports maintaining in the topology graph the link between the ATM device ports where an active VC having the same VPI/VCI at both of the ports is identified for the link, removing from the topology graph the link between the ATM device ports where no active VC having the same VPI/VCI at both of the ports is identified for the link.

Further in accordance with a preferred embodiment of the present invention the removing step includes removing where at least one of the ports has no active VC.

Still further in accordance with a preferred embodiment of the present invention the removing step includes removing where an active VC whose VPI/VCI is not defined is found for at least one of the ports.

Additionally in accordance with a preferred embodiment of the present invention the removing step includes removing where an active VC identified at one of the ports is not an active VC at the other of the ports.

Moreover in accordance with a preferred embodiment of the present invention the maintaining step includes maintaining where the devices and the ports have compatible operational profiles, and the removing step includes removing where the devices or the ports have incompatible operational profiles.

Further in accordance with a preferred embodiment of the present invention the maintain step includes maintaining where no other ATM device port in the network has a VPI/VCI for an active VC that is the same as the VPI/VCI for the active VC identified for the link.

Still further in accordance with a preferred embodiment of the present invention the method further includes removing from the topology graph link between the ATM device ports where another ATM device port in the network has a VPI/VCI for an active VC that is the same as the VPI/VCI for the active VC identified for the link There is additionally provided in accordance with a preferred embodiment of the present invention a method for topology discovery in an ATM network, the method including configuring a plurality of active ports of a plurality of ATM devices with a VPI/VCI known not to exist in the network, establishing a VC between a transmission source within the network and a selected one of the ATM devices along a known path, the selected ATM device has at least one target active port for which a link to any other of the ports is not known to exist in the network, transmitting a cell from the transmission source to the selected ATM device along the path and via the target port, detecting the arrival of the cell at any other of the ports, and where the cell arrives at only one other of the ports, maintaining in a topology graph a link between the target port and the one other of the ports.

Further in accordance with a preferred embodiment of the present invention the configuring step includes configuring only those of the ports for which a link to any other of the ports is not known to exist in the network.

It is appreciated throughout the specification and claims that the term "link" refers to an interconnection between a port of one ATM device, such as a switch, and a port of another ATM device, the term "VC endpoint" refers to a VPI/VCI pair representing a VC on a single port, the term "active link" refers to a link over which the flow of bi-directional network traffic has been detected within a recent, user-definable period of time, using any known means, such a port traffic counter, the term "active VC" refers to a virtual circuit on a link over which the flow of bi-directional network traffic has been detected within a recent, user-definable period of time, using any known means, such as a VC traffic counter, the term "active port" refers to a port through which the flow of bi-directional network traffic has been detected within a recent, user-definable period of time, using any known means, such a port traffic counter, and the term "topology graph" refers to any known record, data structure, table, graph, or other means for describing, expressing, representing and/or storing a network topology.

It is appreciated throughout the specification and claims that the term "flagging" may be understood to be any physical and/or logical act of placeholding, tagging, or identification known in the art that may be applied to physical and/or logical elements operated upon by the present invention.

The disclosures of all patents, patent applications, and other publications mentioned in this specification and of the patents, patent applications, and other publications cited therein are hereby incorporated by reference.

BRIEF DESCRIPTION OF THE DRAWINGS

The present invention will be understood and appreciated more filly from the following detailed description taken in conjunction with the appended drawings in which:

FIGS. 1A and 1B, taken together, are a flowchart illustration of a method for topology discovery in ATM networks virtual path/virtual channel identification matching, operative in accordance with a preferred embodiment of the present invention; and FIG. 2 is a flowchart illustration of a method for topology discovery in ATM networks using fictitious virtual path/virtual channel identification, operative in accordance with a preferred embodiment of the present invention.

DESCRIPTION OF PREFERRED EMBODIMENTS

Figure 1A:
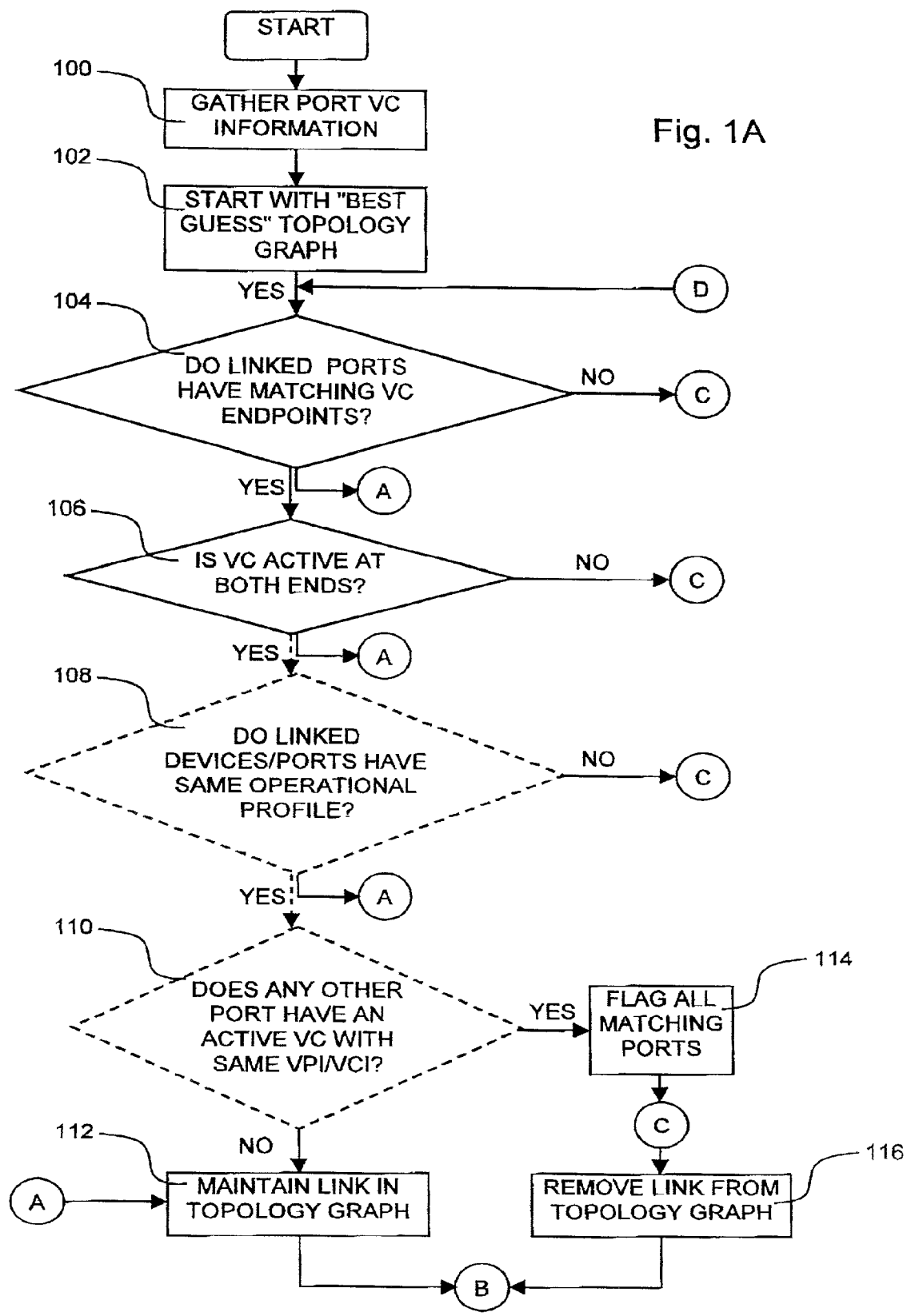

Reference is now made to FIGS. 1A and 1B, which, taken together, are a flowchart illustration of a method for topology discovery in ATM networks using virtual path/virtual channel identification matching, operative in accordance with a preferred embodiment of the present invention. In the method of FIGS. 1A and 1B, port VC information of a plural of networked ATM devices are gathered, using any known method, such as SNMP, Telnet, or TL1, to a device tasked, using any known computer and/or electronic hardware and/or software means, with carrying out steps of the present method as described hereinbelow (step 100) Such port VC information preferably includes the VPI/VCI of all VCs using a port, as well as any known indicator of network traffic for each network device and port, such as cell counters. A "best-guess" topology graph of the interconnections between the ATM devices for which port VC information has been gathered, such as the last known topology indicating links between the various ATM devices, may be used as a starting point for the present method (step 102). The two ports at the ends of each existing link in the topology graph are checked to see if they have matching VC endpoints, ie., if the port VC information for each of the two ports includes the same VPI/VCI pair (step 104). If such a match is found, the VC indicated by the matching VC endpoints is checked to see if the VC is considered to be an active VC at both ends of the link, e.g., if the traffic indicators at either port connecting the link show that the VC is an active VC (step 106). If so, a record of the link is maintained in the topology graph (step 112). If no such active VC is found for a link, the link is removed from the topology (step 116). Thus, for example, if an active VC endpoint is found on one end of a link but its VPI/VCI is not defined at the other end of the link, or its VPI/VCI is defined but the VC is not active at the other end of the link, then the link is removed.

Optionally, the ATM devices and/or ports may be checked to determine whether the two devices/ports have compatible operational profiles for the linked ports, such as compatible maximal data rates, compatible physical connectors, etc (step 108). If a basic incompatibility is found, then the VPI/VCI match might be just a coincidence, and the link is removed from the topology graph (step 116).

Also optionally, for each link for which a matching VPI/VCI is found, the VC information for all other device/ports may be searched to determine if another matching VPI/VCI exists for an active VC (step 110). If more than one match is found, then the link may be treated as if no match has been found, in which case the device/ports are flagged (i.e., the three or more device/ports having active VCs with the same VPI/VCI) (step 114), and the link is removed from the topology graph (step 116).

Steps 104–116 may be performed one or more times, typically until the topology graph does not change between iterations (step 118). Then, for each unflagged but active port for which a definitive match has not yet been found, the VC information for the port is compared with that of every other unflagged and unmatched device/port (step 120), and evaluated in a manner similar to that of steps 104–112 above (steps 122–126). If an active VC at an active but unmatched device/port is matched with another, and preferably only one other, active VC at an active but unmatched device/port, a link is created for the matching device/ports in the topology graph (step 128), otherwise the port is flagged (step 130).

Reference is now made to FIG. 2, which is a flowchart illustration of a method for topology discovery in ATM networks using fictitious virtual path/virtual channel identification, operative in accordance with a preferred embodiment of the present invention The method of FIG. 2 is preferably applied subsequent to and in combination with the application of the method of FIG. 1. In the method of FIG. 2, each unmatched but active ATM device/port is configured with the same VPI/VCI using any known means, preferably where the VPI/VCI is "fictitious," i.e., known not to exist in the network (step 200). A path in the topology graph whose links have been verified using the method of FIG. 1 or any other known method is found from a transmitting source to an ATM device with at least one matched port and at least one unmatched but active port, also referred to herein as an unmatched transmitting port (step 202). A permanent VC is established between a transmission source within the network and the unmatched transmitting port via the matched port (step 204). A transmission is then sent via the PVC (step 206) All other unmatched ports that were configured with the fictitious VPI/VCI are then checked using any known means, such as by checking each port's traffic counter before and after the transmission is sent in order to detect an increase in the counter, to determine if any port received the transmission (step 208). If one other port received the transmission, then a link is created for the receiving port and the unmatched transmitting port in the topology graph (step 210)

Steps 200–210 may be performed one or more times for each ATM device having a matched port and an unmatched but active port, typically until the topology graph does not change between iterations.

It is appreciated that one or more of the steps of any of the methods described herein may be omitted or carried out in a different order than that shown, without departing from the true spirit and scope of the invention While the present invention as disclosed herein may or may not have been described with reference to specific computer and/or network hardware or software, the present invention has been described in a manner sufficient to enable persons of ordinary skill in the art to readily adapt commercially available computer and/or network hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for topology discovery in an ATM network, the method comprising:

configuring a plurality of unmatched but active ports of a plurality of ATM devices with a VPIIVCJ known not to exist in said network;

finding a path in a topology graph of said network from a transmitting source within said network to a selected one of said ATM devices having a matched port and a configured unmatched port;

establishing a permanent virtual circuit (PVC) between said transmission source and an unmatched transmitting port, being said configured unmatched port of said selected ATM device, via said matched port along said path;

transmitting a cell from said transmission source via said PVC;

detecting the arrival of said cell at any other of said configured unmatched ports; and where said cell is received by only one other of said configured unmatched ports, creating in said topology graph a link between said unmatched transmitting port and said receiving port.

* * * * *

UNITED STATES PATENT AND TRADEMARK OFFICE
CERTIFICATE OF CORRECTION

PATENT NO.        : 7,082,105 B2                                    Page 1 of 1
APPLICATION NO.   : 09/842787
DATED             : July 25, 2006
INVENTOR(S)       : Sharon Barkai, Ariel Noy and Yoel Shkolnisky It is certified that error appears in the above-identified patent and that said Letters Patent is hereby corrected as shown below:

Claim 1, line 26, col. 6 the word "VPIIVCJ" should be -- VPI/VCI --.

Signed and Sealed this

Twentieth Day of May, 2008

JON W. DUDAS
*Director of the United States Patent and Trademark Office*